(12) United States Patent
Twiss et al.

(10) Patent No.: US 8,244,867 B2
(45) Date of Patent: Aug. 14, 2012

(54) SYSTEM AND METHOD FOR THE LOCATION OF CACHES

(75) Inventors: Adam Dominic Twiss, Cambridge (GB); David Sinclair Ferguson, Cambridge (GB); Jim Minter, Ely (GB)

(73) Assignee: Velocix Limited, Cambridgeshire (GB)

( * ) Notice: Subject to any disclaimer, the term of this patent is extended or adjusted under 35 U.S.C. 154(b) by 1179 days.

(21) Appl. No.: 11/598,114

(22) Filed: Nov. 8, 2006

(65) Prior Publication Data
US 2008/0040482 A1   Feb. 14, 2008

(30) Foreign Application Priority Data

Aug. 11, 2006   (GB) .................................. 0615962.8

(51) Int. Cl.
*G06F 15/16* (2006.01)
(52) U.S. Cl. ...................................................... 709/226
(58) Field of Classification Search .................. 709/220, 709/205, 203, 206, 231, 245, 251, 223, 238, 709/217, 228, 227, 225, 224, 215, 209, 204, 709/246, 240, 229, 226, 218, 216, 201; 707/201, 707/200, 104.1, 102, 100, 10, 3; 726/26, 726/22, 12, 4; 370/409, 389, 254, 252, 236, 370/338, 370, 270; 719/330, 313, 310
See application file for complete search history.

(56) References Cited

U.S. PATENT DOCUMENTS

| | | |
|---|---|---|
| 5,511,208 A | 4/1996 | Boyles |
| 5,892,914 A | 4/1999 | Pitts |
| 6,003,030 A | 12/1999 | Kenner |
| 6,098,096 A | 8/2000 | Tsirigotis |
| 6,108,703 A | 8/2000 | Leighton |
| 6,167,438 A | 12/2000 | Yates |
| 6,415,280 B1 | 7/2002 | Farber |
| 6,745,243 B2 | 6/2004 | Squire |
| 6,823,377 B1 | 11/2004 | Wu et al. |
| 6,928,441 B2 | 8/2005 | Haegele |
| 7,010,578 B1 | 3/2006 | Lewin |
| 7,043,558 B2 | 5/2006 | Yoshida |
| 2003/0158958 A1 | 8/2003 | Chiu |

(Continued)

FOREIGN PATENT DOCUMENTS
EP            0 847 020         10/1998
(Continued)

OTHER PUBLICATIONS

Chandhok, Nikhil—Web Distribution Systems: Caching and Replication, Nov. 18, 1999, pp. 1-13, http://www.cse.wustl.edu/%7Ejain/cis788-99/ftp/web_caching/index.html.
Konstanty, Piotr—Web Cache Charging Policies, Nicholas Copernicus University, NLANR Web Caching Workshop, Torun, Poland, Coulder, 1997, 3 pages http://workshop97.ircache.net/Papers/Kozinski/kozinski.html.

(Continued)

*Primary Examiner* — Asad M Nawaz
*Assistant Examiner* — Charles Murphy
(74) *Attorney, Agent, or Firm* — Ryan, Mason & Lewis, LLP

(57) ABSTRACT

A method for selecting a preferred cache for the download of digital data from a plurality of caches is disclosed. The method comprises the steps of requesting an address of the preferred cache and selecting the preferred cache from the plurality of caches. The selection of the preferred cache is derived from a location identifier of a client requesting the download of the digital data.

22 Claims, 9 Drawing Sheets

U.S. PATENT DOCUMENTS

| | | | |
|---|---|---|---|
| 2003/0204602 A1 | 10/2003 | Hudson | 709/228 |
| 2003/0225924 A1* | 12/2003 | Jung et al. | 709/313 |
| 2004/0148344 A1 | 7/2004 | Navar et al. | |
| 2004/0193714 A1 | 9/2004 | Bowman | |
| 2005/0132049 A1 | 6/2005 | Inoue et al. | |
| 2005/0192999 A1* | 9/2005 | Cook et al. | 707/102 |
| 2005/0198328 A1* | 9/2005 | Lee et al. | 709/229 |
| 2006/0010225 A1* | 1/2006 | Issa | 709/217 |
| 2006/0165014 A1 | 7/2006 | Ikeda | 370/254 |
| 2007/0094279 A1* | 4/2007 | Mittal et al. | 707/100 |

FOREIGN PATENT DOCUMENTS

| | | | |
|---|---|---|---|
| EP | 0 315 091 | | 5/2003 |
| EP | 1 413 119 | | 5/2006 |
| GB | 2 365 166 | A | 2/2002 |
| GB | 2 366 406 | A | 3/2002 |
| GB | 2412279 | A | 9/2005 |
| WO | WO 99/05584 | | 2/1999 |
| WO | WO 02/42900 | A2 | 5/2002 |
| WO | WO 02/44915 | A1 | 6/2002 |
| WO | WO 02/058360 | A3 | 7/2002 |
| WO | WO 02/089000 | A1 | 11/2002 |
| WO | WO 03/015377 | A1 | 2/2003 |
| WO | WO 2004073281 | A2 * | 8/2004 |
| WO | WO 2005/084132 | A2 | 9/2005 |

OTHER PUBLICATIONS

Malpani, Radhika—Making World Wide Web Caching Servers Cooperate, University of California at Berkeley, 10 pages, 1995 http://bmrc.berkeley.edu/research/publications/1995/138/paper-59.html.

XP-002460863, Peer to Peer Cache Discovery Protocol (CDP) cachelogic-cdp-specification-02.txt, CacheLogic Ltd., Aug. 25, 2006.

Chu, H., "Relay Mode," Dec. 16, 2005, http://rakshasa.no/pipermail/libtorren_t-devel/2005-December/000447.html>, pp. 1-2.

Vlavianos, A. et al., "BiToS: Enhancing BitTorrent for Supporting Streaming Applications," Department of Computer Science and Engineering, University of California Riverside, pp. 1-6, http://castor.sics.se/presentations/papers/bitos.pdf.

Legout, A. et al., "Understanding BitTorrent: An Experimental Perspective," INRIA-00000156, Version 3, Nov. 9, 2005, I.N.R.I.A., Sophia Antipolis, France, http://hal.inria.fr/inria-00000156/en, pp. 1-16.

Otto, C., "IO bound," Thursday, Apr. 12, 2007, http://lists.ibiblio.org/pipermail/bittorrent/2007-April/002075.html, p. 1.

International Search Report and the Written Opinion for International Application No. PCT/EP2007/007107, mailed on Nov. 26, 2007.

* cited by examiner

700

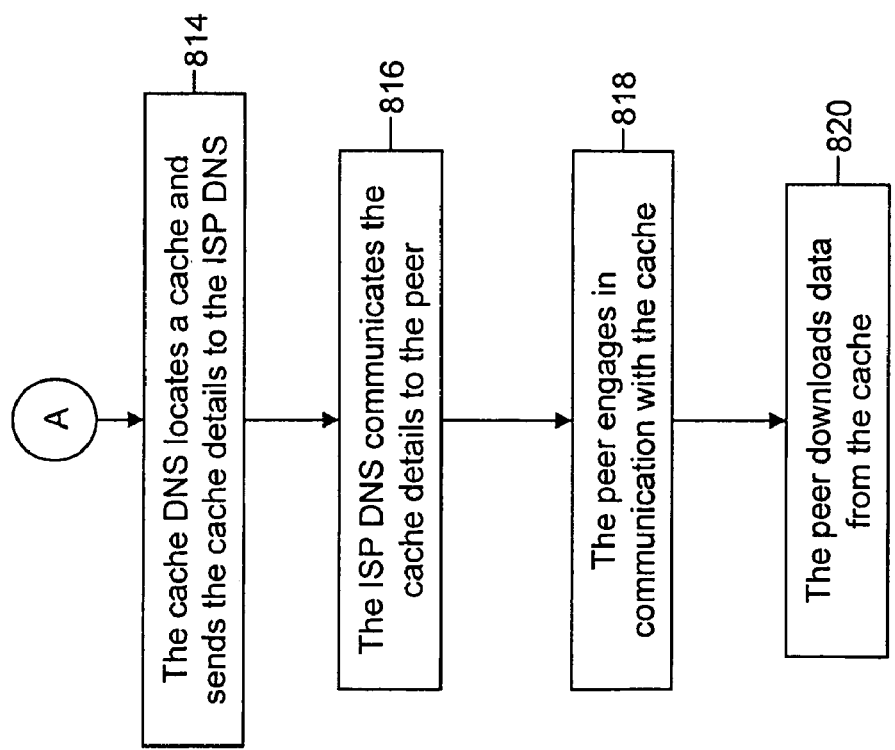

SYSTEM AND METHOD FOR THE LOCATION OF CACHES

FIELD OF THE INVENTION

The invention relates to a method and a server for selecting a cache for the download of digital data, in particular the invention relates to the selection of a cache in a peer-to-peer network.

BACKGROUND TO THE INVENTION

A peer-to-peer (also termed P2P) computer network is a network that relies primarily on the computing power and bandwidth of the participants in the computer network rather than concentrating computing power and bandwidth in a relatively low number of servers. P2P computer networks are typically used for connecting nodes of the computer network via largely ad hoc connections. The P2P computer network is useful for many purposes. Sharing content files containing, for example, audio, video and data is very common. Real time data, such as telephony traffic, is also passed using the P2P network.

A pure P2P network does not have the notion of clients or servers, but only equal peer nodes that simultaneously function as both "clients" and "servers" to the other nodes on the network. This model of network arrangement differs from the client-server model in which communication is usually to and from a central server. A typical example for a non P2P file transfer is an FTP server where the client and server programs are quite distinct. In the FTP server clients initiate the download/uploads and the servers react to and satisfy these requests from the clients.

Some networks and channels, such as Napster, OpenNAP, or IRC @find, use a client-server structure for some tasks (e.g., searching) and a P2P structure for other tasks. Networks such as Gnutella or Freenet use the P2P structure for all purposes, and are sometimes referred to as true P2P networks, although Gnutella is greatly facilitated by directory servers that inform peers of the network addresses of other peers.

One of the most popular file distribution programs used in P2P networks is currently BitTorrent which was created by Bram Cohen. BitTorrent is designed to distribute large amounts of data widely without incurring the corresponding consumption in costly server and bandwidth resources. To share a file or group of files through BitTorrent, clients first create a "torrent file". This is a small file which contains meta-information about the files to be shared and about the host computer (the "tracker") that coordinates the file distribution. Torrent files contain an "announce" section, which specifies the URL of a tracker, and an "info" section which contains (suggested) names for the files, their lengths, the piece length used, and a SHA-1 hash code for each piece, which clients should use to verify the integrity of the data they receive.

The tracker is a server that keeps track of which seeds (i.e. a node with the complete file or group of files) and peers (i.e. nodes that do not yet have the complete file or group of files) are in a swarm (the expression for all of the seeds and peers involved in the distribution of a single file or group of files). Nodes report information to the tracker periodically and from time-to-time request and receive information about other nodes to which they can connect. The tracker is not directly involved in the data transfer and is not required to have a copy of the file. Nodes that have finished downloading the file may also choose to act as seeds, i.e. the node provides a complete copy of the file. After the torrent file is created, a link to the torrent file is placed on a website or elsewhere, and it is normally registered with the tracker. BitTorrent trackers maintain lists of the nodes currently participating in each torrent. The computer with the initial copy of the file is referred to as the initial seeder.

Using a web browser, users navigate to a site listing the torrent, download the torrent, and open the torrent in a BitTorrent client stored on their local machines. After opening the torrent, the BitTorrent client connects to the tracker, which provides the BitTorrent client with a list of clients currently downloading the file or files.

Initially, there may be no other peers in the swarm, in which case the client connects directly to the initial seeder and begins to request pieces. The BitTorrent protocol breaks down files into a number of much smaller pieces, typically a quarter of a megabyte (256 KB) in size. Larger file sizes typically have larger pieces. For example, a 4.37 GB file may have a piece size of 4 MB (4096 KB). The pieces are checked as they are received by the BitTorrent client using a hash algorithm to ensure that they are error free.

As further peers enter the swarm, all of the peers begin sharing pieces with one another, instead of downloading directly from the initial seeder. Clients incorporate mechanisms to optimize their download and upload rates. Peers may download pieces in a random order and may prefer to download the pieces that are rarest amongst it peers, to increase the opportunity to exchange data. Exchange of data is only possible if two peers have a different subset of the file. It is known, for example, in the BitTorrent protocol that a peer initially joining the swarm will send to other members of the swarm a BitField message which indicates an initial set of pieces of the digital object which the peer has available for download by other ones of the peers. On receipt of further ones of the pieces, the peer will send a Have message to the other peers to indicate that the further ones of the pieces are available for download.

Caches are used throughout the Internet to provide as data stores. The cache saves a copy of data objects for access by clients. The reason that the caches are used is that they provide for fast access to the data objects at a convenient location for the client.

In some instances a plurality of caches are available for the supply of a particular data object. One of the caches has to be selected that is preferred for a particular download of the data object to the client. Caches are generally selected depending upon their availability, data stored on the caches and location of a cache. In many cases, caches are selected based on the location of an internet service provider (ISP) or upon locations of a DNS server of the ISP.

SUMMARY OF THE INVENTION

This invention provides a method for selecting a preferred cache for the download of digital data from a plurality of caches, the method comprising: a first step of requesting an address of the preferred cache; and a second step of selecting the preferred cache from the plurality of caches, the selection being derived from a location identifier of the client requesting the download of the digital data.

This invention furthermore provides a server for selecting a preferred cache for the download of digital data from a plurality of caches, the selection being derived from a location identifier of a client requesting a download of the digital data. The server may be either a proxy for tracker communication, incorporated into a tracker or a dedicated cache location server.

It can be advantageous to take a location identifier, or network address, of the client, which can be preferably the IP address of the client to select the cache that is located closest to the client to whom the digital data will be downloaded. In this way network traffic can be reduced and download times for the digital object can be effectively increased.

In many applications, the client may be a peer in a P2P network and the client will request the download. The invention is not limited to the use and other elements of a network may request the download of digital data to the client.

Digital data may be any data, for example music files, video files or any other type of data files.

The server may also return a handle to the client giving the client a cache identification identifier, such as a network address, to connect to the cache or to another data source for download of digital data. The final network address may be provided by a name server that can be a central DNS server.

The method may be carried out in a one stage request procedure. In response to the request, a preferred cache will be selected and the address of the preferred cache is returned to the client.

The step of requesting the preferred address is a two stage process, wherein a first stage comprises returning a handle. A second stage comprises requesting the address of the preferred cache by name to a name server where the name includes the handle and other information from the meta-information relating to the digital data. The name may be returned to the client and may allow for requesting a cache or data source address via an Internet Service Provider (ISP) DNS server. The ISP DNS or any other DNS server may then directly resolve the name or transfer the request to a central DNS or further name servers. The central DNS can thereby be integrated into the server or be a separate component. The server and central DNS can also be located in the same place or at distance from each other.

In case of the two stage processes, the handle may comprise one or more of location, publisher, protocol information or the like. The location, publisher and protocol information may have the form of a data string. The handle may then be used for the selection of the preferred cache and selection may be based on one or more of the location, publisher and protocol information.

The server is preferably connected to a database. The database may store information upon availability of the plurality of caches, network costs, location and availability of data and/or network tasks. It may also store data for resolving network addresses, i.e., IP addresses.

It is also preferred that a DNS, such as the central DNS is connected to a database for resolving the handle information and for transferring the locations of the preferred cache.

Two different databases may be used, a first database for the server and a second database for the central DNS. However, the two databases may also be connected to each other or preferably combined to a single database.

The server may also be integrated or connected to other components such as a tracker, tracking peer-to-peer information. Thus, a request for download may be sent to the tracker instead of to a separate server. The tracker may have access to the databases, caches, private trackers, and the like. The tracker may also return a handle in a first stage. The address of the preferred cache may also be derived from peer-to-peer information tracked in the tracker.

DESCRIPTION OF THE DRAWINGS

FIGS. 8A and 8B show a flowchart for a method of selecting a cache for a download of a digital object.

DETAILED DESCRIPTION OF THE INVENTION

Figure 1:
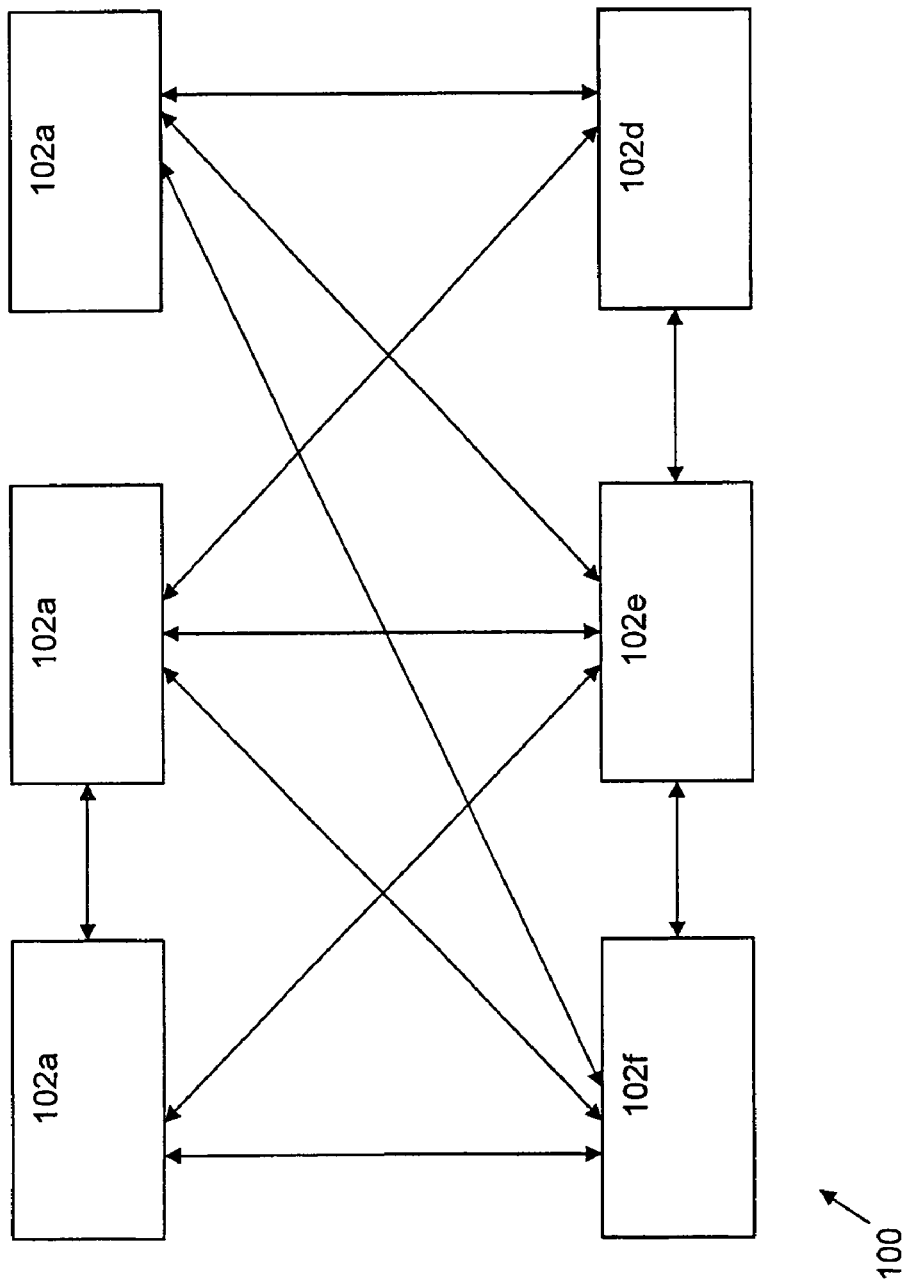
FIG. 1 shows a Peer-to Peer network as known in the art.

FIG. 1 is a block diagram illustrating an environment in which various exemplary embodiments of the invention may be practiced. FIG. 1 includes a Peer-to-Peer (P2P) network 100. The P2P network 100 includes a plurality of peers, such as peer 102a, 102b, 102c, 102d, 102e and 102f, hereinafter referred to as peers 102, connected to each other. P2P network 100 may be a Local Area Network (LAN), a Wide Area Network (WAN), a Metropolitan Area Network (MAN), a wireless network, or the like. The peers 102 present in the P2P network 100 include stored digital data. Various examples of the digital data include, but are not limited to, an application file, a video file, a music file, or the like. In P2P network 100 the digital data is shared among the peers 102. It should be understood that the peers 102 may store multiple copies of the digital data.

Figure 2:
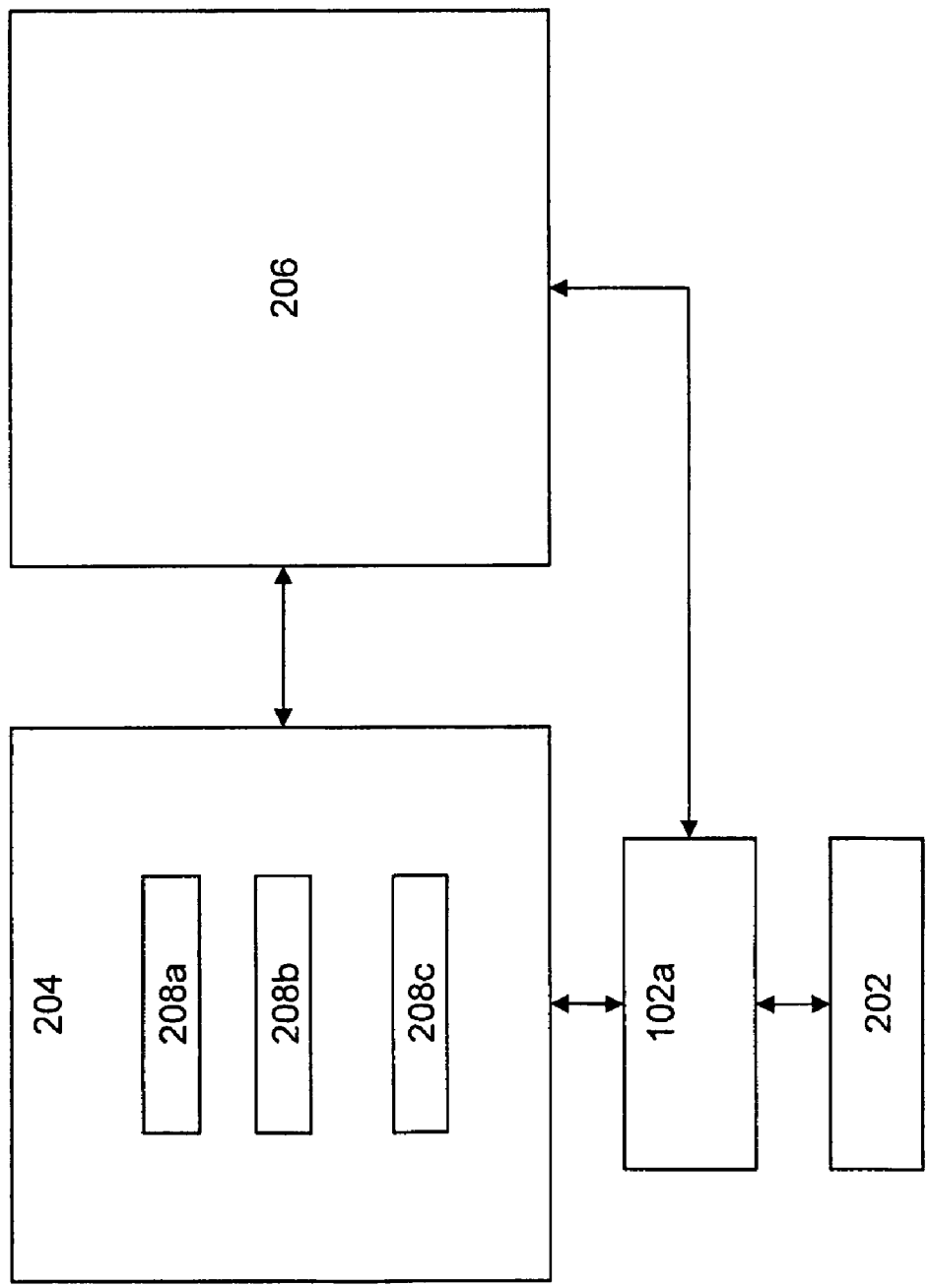
FIG. 2 shows the request for a download of a digital object.

FIG. 2 is a block diagram illustrating a user 202 sending a request for download of a digital object through peer 102a. FIG. 2 includes the peer 102a, the user 202, a server 204 and a tracker 206. The server 204 may include one or more torrent files, such as torrent file 208a, 208b and 208c, hereinafter referred to as the torrent files 208. The present invention has been described with respect to BitTorrent protocol as an example only. It should be understood by those skilled in the art that present invention is applicable to all P2P protocols.

The user 202 makes a request at the peer 102a to download the digital object from the peer-to-peer network 100. The peer 102a communicates with the server 204 and provides information for the digital object to be downloaded to the server 204. Subsequently, the server 204 locates one of the torrent files related to the digital object requested for download by peer 102a, such as, for example, torrent file 208a. The torrent files 208 include information related to the name, size, number of pieces and check sum error for the digital object to be downloaded by peer 102a.

Subsequently, the tracker 206 may provide a list of peers 102 present in the P2P network 100 with the pieces of the digital object to be downloaded. The peer 102a, thereafter, communicates with the available list of peers 102 for downloading the related digital objects. The peer 102a communicates with peers 102 by sending a bit field of the pieces of the digital object that peer 102a has. After peer 102a receives the bitfields from peers 102, it sends a message to the peers 102 where it finds relevant data and starts downloading the pieces of the requested digital object.

Figure 3:
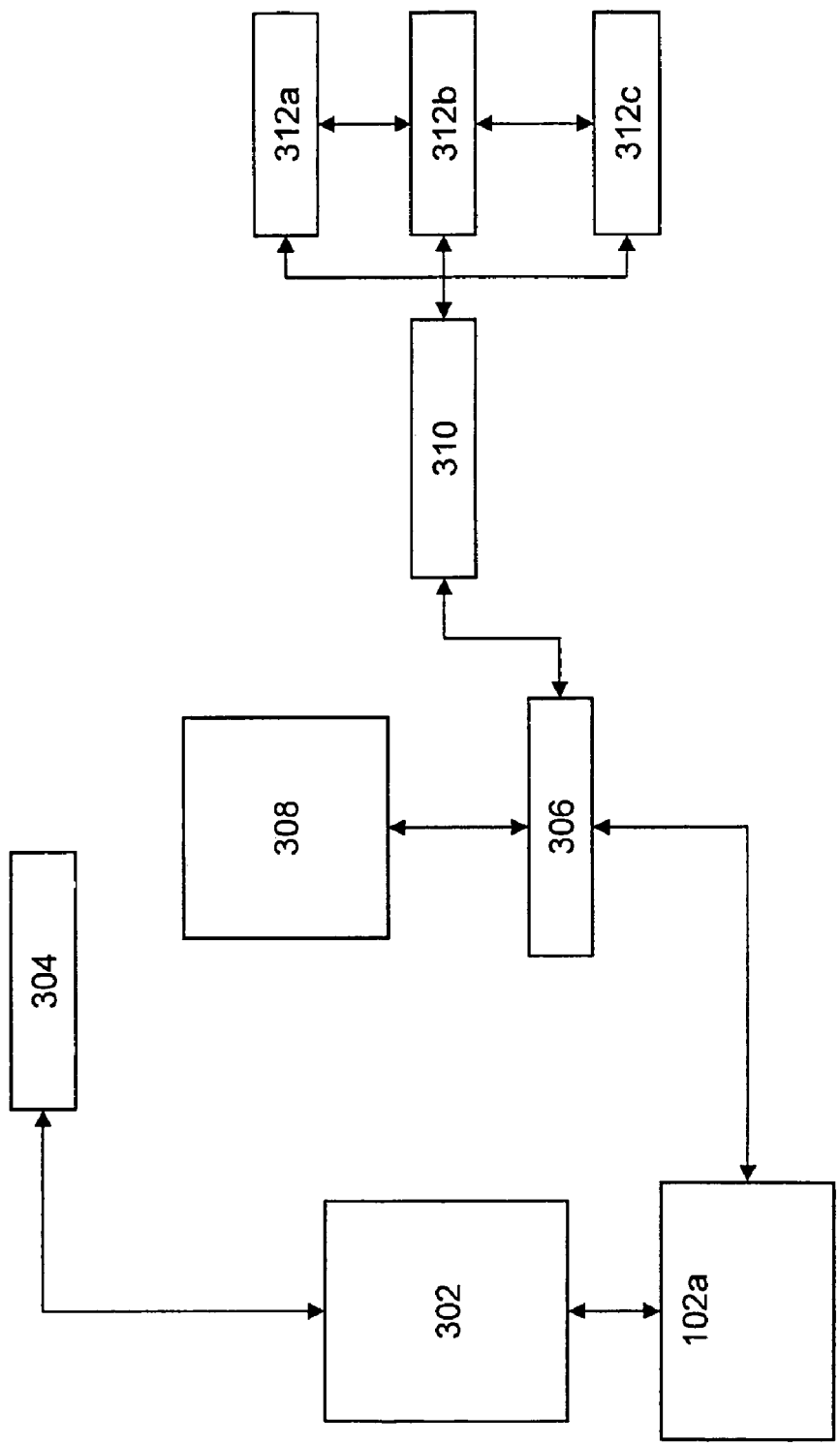
FIG. 3 shows an overview of the network in accordance with the invention.

FIG. 3 is a block diagram illustrating peer 102a in communication with a Cache Location Server (CLS) 302, in accordance with an example of the present invention. FIG. 3 includes the peer 102a, the CLS 302, a database 304, an Internet Service Provider Domain Name Server (ISP DNS) 306, a central Domain Name Server (central DNS) 308, a cache DNS 310 and one or more caches, such as, cache 312a, 312b and 312c, hereinafter referred to as caches 312.

The peer 102a communicates with the CLS 302. The information sent by the peer 102a to the CLS 302 may also contain the IP address of the peer 102a. Based on the received information, the CLS 302 communicates a location string to the peer 102a. The CLS 302 may get the location string from the database 304. The database 304 stores information about the IP address ranges of countries, ISPs, regions, towns, etc for the purpose of generating specific location strings with respect to peers 102.

The peer 102a then, using the location string and information from the Torrent File 208, makes communication with the ISP DNS 306.

As illustrative examples only, the information sent by peer 102a to ISP DNS 306 may be as follows:

Protocol-TruncatedHash.Protocol-Publisher-Location-String.Find-Cache.com

An example of the information sent by CLS 302 to peer 102a may be as following:

bt-1234.bt-bigcorp-bigispnyc.find-cache.com where, 'bt' represents the BitTorrent protocol used by the peer 102a, '1234' representing a specific hash value associated with the digital object to be downloaded by the peer 102a, 'bigcorp' representing the publisher (a fictional "Big Corporation") of the digital object to be downloaded, 'bigispnyc' representing the location string for the peer 102a (the New York point of presence for a fictional "Big ISP").

Based on this communication, the ISP DNS 306 redirects the request to the central DNS 308 (which is the name server for the domain contained in the communication). Thereafter, the central DNS 308 provides an address of the cache DNS 310 to the ISP DNS 306. The cache DNS 310, thus, receives a DNS request from the ISP DNS 306 for the digital object to be downloaded. Subsequently, the cache DNS 310 allocates one of the caches 312, such as, for example, cache 312a. The cache DNS 310 may allocate one of the caches 312 based on the load, availability and content on each of them. The cache DNS 310 communicates this information to the ISP DNS 306, which in turn communicates the information to the peer 102a.

In an example of the invention, the tracker 206 is able to provide the DNS name or IP address to the peer 102a. The tracker 206 receives the IP address of the peer 102a and uses this to calculate the location string.

A proxy for tracker communication may be used which is connected to the peer 102a. The proxy (not shown) is situated close to the peer 102a-usually at the same point of access into the Internet. Thus the proxy cache may be provided the relevant DNS name or IP address for the peer 102a and insert into responses from the tracker.

The peer 102a, thereafter, makes a communication with the cache 312a for downloading the digital object. The communication between the peer 102a and cache 312a is explained in detail in FIG. 4.

Figure 4:
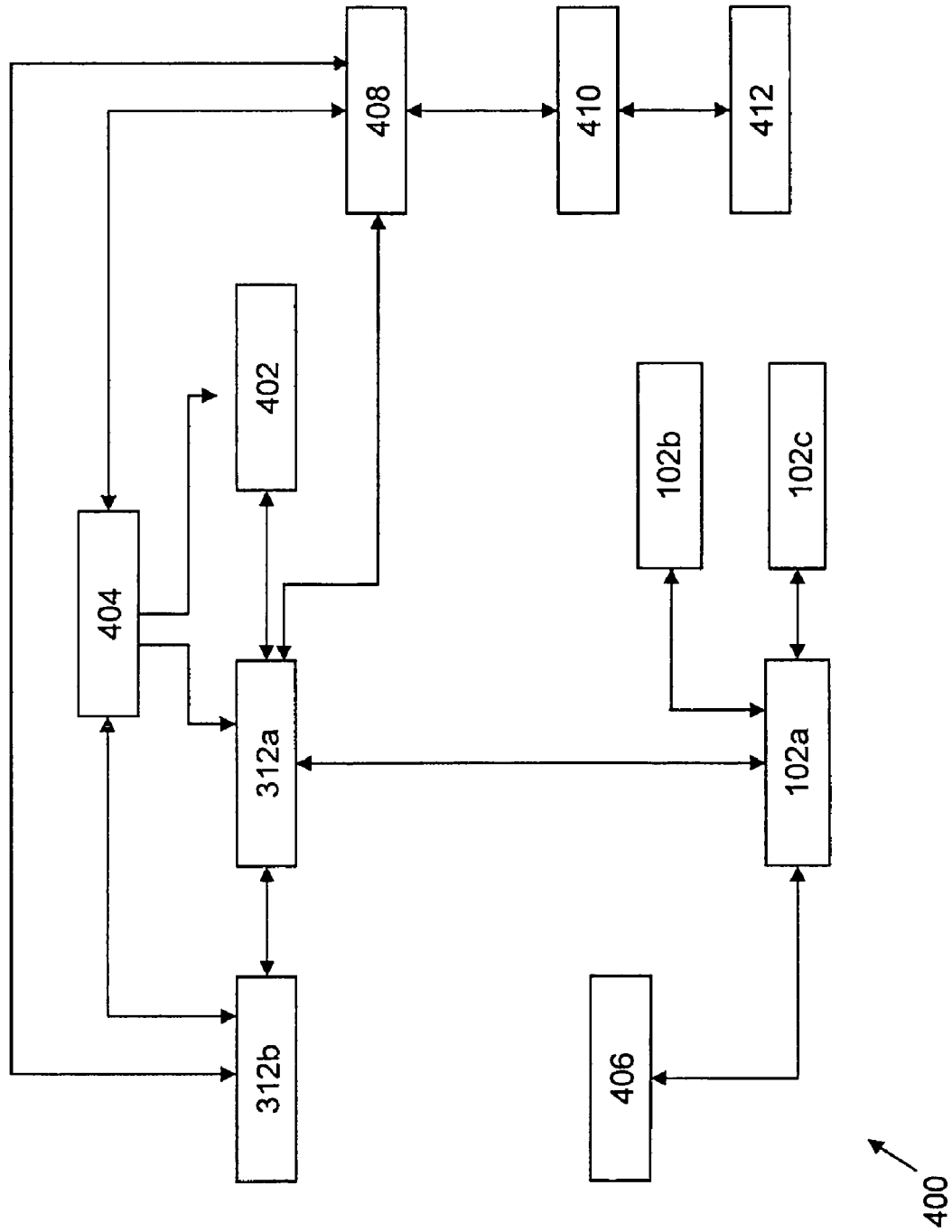
FIG. 4 shows an overview for the distribution of content.

FIG. 4 is a block diagram illustrating a system 400 for content distribution in the P2P network 100. The system 400 includes the peer 102a, 102b and 102c, the cache 312a and 312b, a content server 402, a private tracker 404, a public tracker 406, a business logic unit 408, a central database server 410 and a user interface unit 412.

The peer 102a sends a request to the cache 312a for downloading the digital object. The cache 312a is connected to the content server 402 and the private tracker 404. The content server 402 may include complete copies of a plurality of stored digital objects in the P2P network 100. In an example of the present invention, the content server 402 is connected to a publisher's computer network. The content server 402 receives the digital objects, which are to be distributed, from the publisher's computer network. For example, the publisher wishing to distribute a video file in the P2P network 100 would first upload the video file to the content server 402. Thereafter, the video file can be subsequently downloaded by the peers 102 from the content server 402.

In an example of the present invention, as soon as the publisher uploads a piece of the digital object on the content server 402, the digital data becomes available for the peers 102 to be downloaded. Thus, as the publisher progresses with the upload of subsequent pieces of the digital object, the peers 102 are able to download those uploaded pieces in parallel. Therefore, the capability of the system 400 to execute parallel uploads and downloads of the digital object from the content server 402 ensures an efficient real time availability of digital objects in the P2P network 100.

The cache 312a downloads the digital objects, based on the request from the peer 102a, from the content server 402. If the digital object requested by the peer 102a is available on the cache 312a, the peer 102a downloads the digital object from the cache 312a. If the digital object is not available on the cache 312a, the cache 312a downloads the requested digital object from the content server 402. Thereafter, the cache 312a makes the digital object available to the peer 102a for downloading. In an example of the present invention, the peer 102a may also download the related digital objects from the other peers 102 available in the P2P network 100, such as, for example, peer 102b and peer 102c.

In another example of the present invention, the cache 312a may upload digital objects from the peers 102 available in the P2P network 100. In such a case, the cache 312a acts as one of the peers 102.

The private tracker 404 maintains a track of all the data transferred between the content server 402 and the caches 312. The tracking of the transferred data by the private tracker 404 eliminates the condition where the cache 312a acquires more than one copy of the same digital object.

The public tracker 406 is connected to all of the caches 312 and to all of the peers 102 in the P2P network 100. The public tracker 406 maintains a track of all the data digital objects transferred among the caches 312 and the peers 102. In particular, the public tracker 406 maintains a list of all of the peers 102 and the caches 312 which hold copies of the digital objects available in the P2P network 100.

The business logic unit 408 is connected to all the caches 312 and the private tracker 404. The business logic unit 408 authenticates peers 102 before allowing the peers 102 to upload any digital object. Further, the business logic unit 408 is connected to the central database server 410. The business logic unit 408 acts as an interface between the P2P network 100 and the central database server 410. Central database server 410 acquires log reports from the private tracker 404 and caches 312, through the business logic unit 408, for all the data shared between the caches 312 and the content server 402. Using the information from the central database server 410 obtained via the business logic unit 408, such as, the log reports, the user interface unit 412 provides the required information for billing purposes and report generation.

The central database server 410 may be connected to the public tracker 406. In another embodiment of the present invention, the public tracker 406 may be connected to the private tracker 404.

The public tracker 406 may be connected to all the caches 312 available in the P2P network 100, such as, for example, cache 312a and cache 312b.

Figure 5:
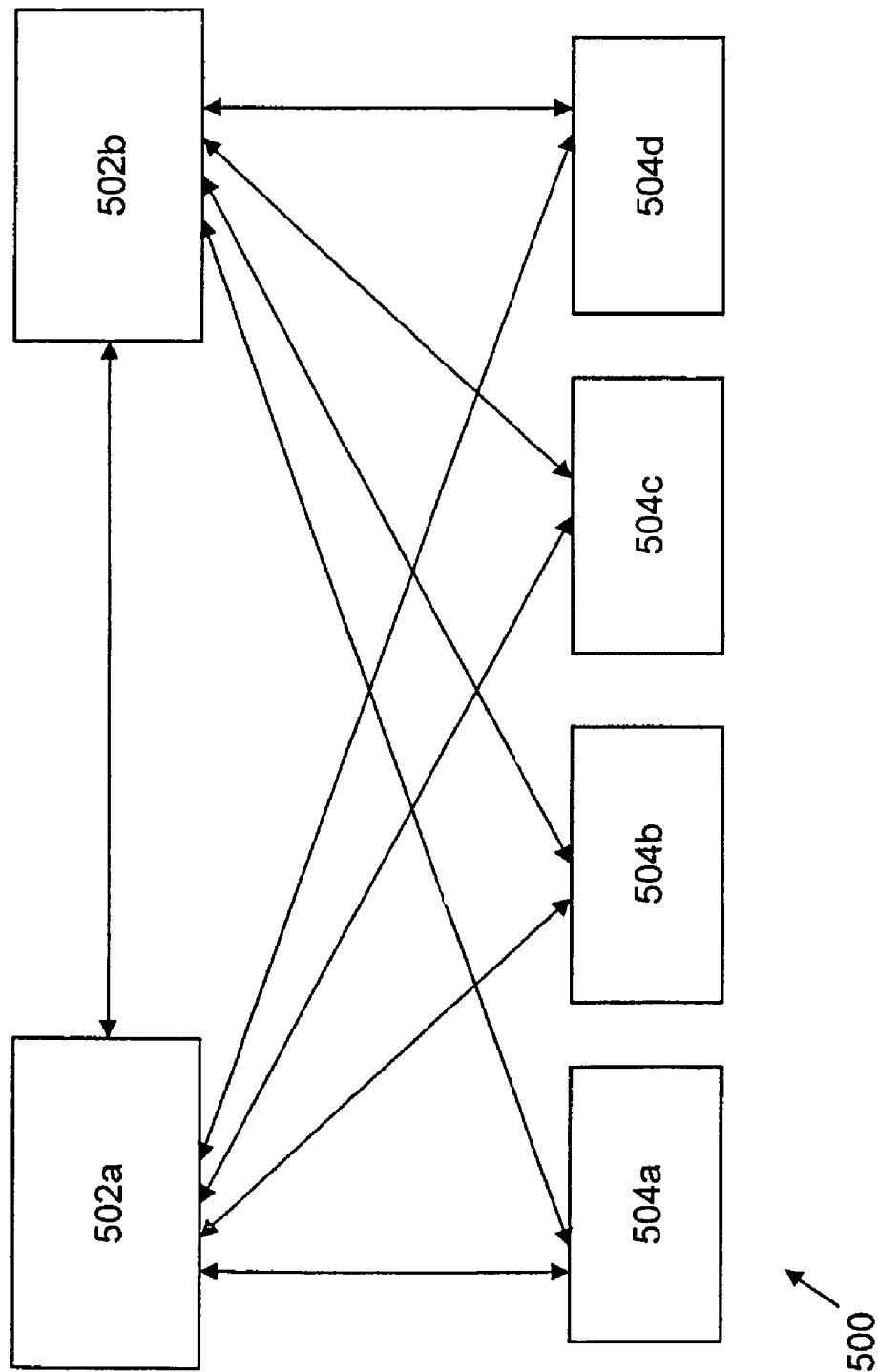
FIG. 5 shows a geographical implementation of a content distribution network

FIG. 5 is a block diagram illustrating an exemplary geographical implementation of a cache distribution network 500. The cache distribution network 500 includes one or more service points of presence, such as, a service point of presence 502a and 502b, hereinafter referred to as the service points of presence (POPs) 502. The cache distribution network 500 further includes one or more data points of presence, such as, data point of presence 504a, 504b, 504c and 504d, hereinafter referred to as data points of presence (POPs) 504. The service POPs 502 are located at remote geographical locations for, such as, for example London, San Jose and so forth. It should be understood by those skilled in art that the number of the service POPs 502 locations are scalable and may be increased with the increase in network traffic. The service POPs 502, such as the service POP 502a and 502b, are connected to each other. The connection between the service POPs 502 enables a real time data and information transfer between all of the service POPs 502, Furthermore, the data POPs 504 are also located in remote geographical locations across the globe, such as, for example, New York, Frankfurt and so forth. It should be understood by those skilled in art that the number of the data POPs 504 locations are scalable and may be increased with the increase in network traffic and digital objects available in the P2P network 100. The data POPs 504, such as the data POP 504a and 504b, are connected with all the available service POPs 502 in the P2P network 100. The connection between the data POPs 504 and service POPs 502 enables a real time data update and information transfer between the data POPs 504 from the service POPs 502, The geographical location may include both, the service POP 502a and the data POP 504a.

Figure 6:
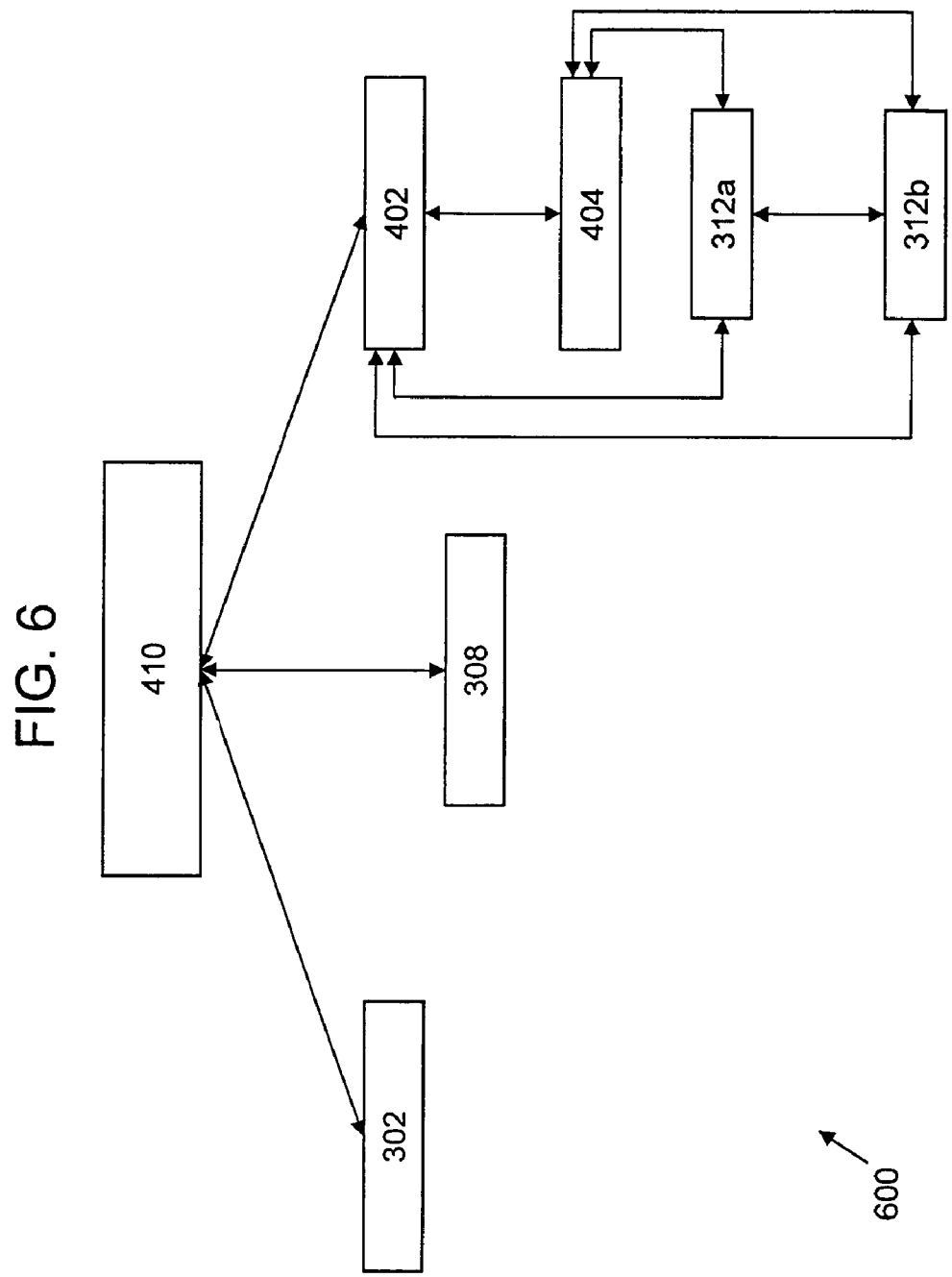
FIG. 6 shows an overview of a service point of presence.

FIG. 6 is a block diagram illustrating an arrangement 600 of the components of the service POP 502a, in accordance with an example of the present invention. The arrangement 600 for the service POP 502a includes the cache location server 302, the central domain name server 308, the content server 402, the private tracker 404, the business logic unit 408 and the central database server 410. Further, in an example of the present invention, the arrangement 600 for the service POP 502a may include the caches 312, such as, the cache 312a and 312b. The arrangement 600 for the service POP 502a may include the public tracker 406, the business logic unit 408 and the user interface unit 412.

The central database server 410 can be located in each of the service POPs 502. The central database server 410 of each of the service POPs 502 are connected to each other and act as a central database unit.

It should be understood by those skilled in the art that the components illustrated in the arrangement 600 for the service POP 502a are scalable and may be increased based on the network traffic and the digital objects available in the P2P network 100.

Figure 7:
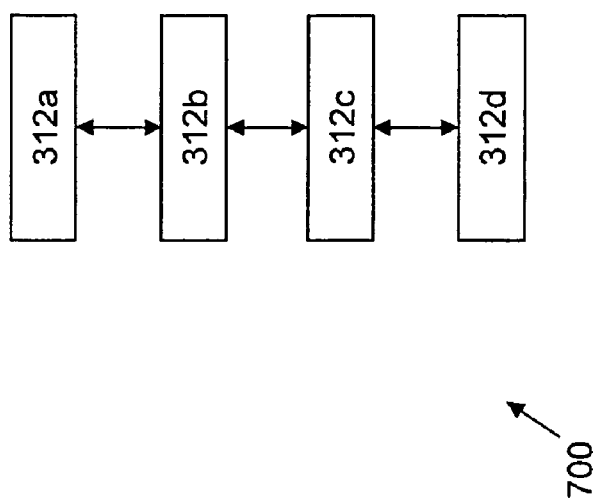
FIG. 7 shows an overview of a data point of presence.

FIG. 7 is a block diagram illustrating an arrangement 700 of the components of the data POP 504a, in accordance with an example of the present invention. The arrangement 700 for the data POP 504a includes the caches 312, such as, the caches 312a, 312b, 312c and 312d and the cache DNS 310. The data POP 504a provides digital objects for the peers 102 in the P2P network 100. The data POPs 504 download data from the service POPs 502.

It should be understood by those skilled in the art that the components illustrated in the arrangement 700 for the data POP 504a are scalable and may be increased based on the network traffic and the digital objects available in the P2P network 100.

Figure 8A:
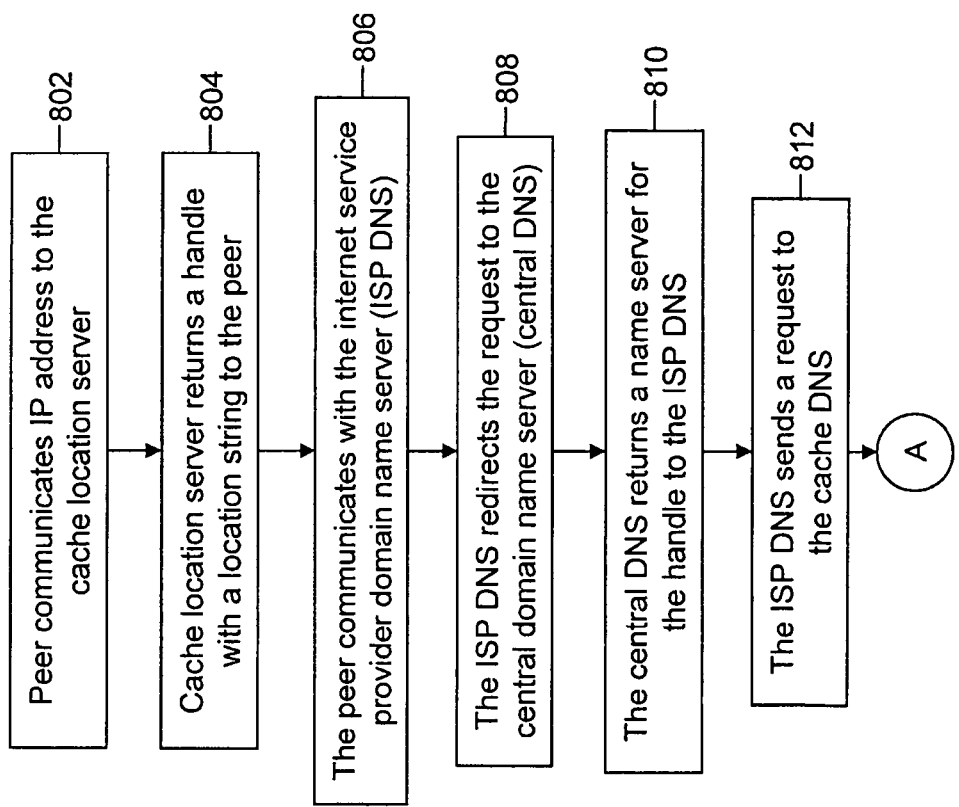

FIGS. 8a and 8b illustrate a flowchart for a method of selecting the cache 312a for the download of digital objects by the peer 102a in one example of the invention. At step 802, the peer 102a communicates the IP address of the client to the CLS 302 when the peer 102a requests for downloading a file. At step 804, the CLS 302 returns a handle including a location string for the peer 102a. The CLS 302 may get the location string from the database 304. The CLS 302 can locate the caches 312 closest to the peers 102 based on the generated location strings. The handle and the location string have been explained in FIG. 3.

In other examples of the invention, the peer 102a receives the DNS name or IP address from either the tracker 206 or a proxy for tracker communication as explained above.

At step 806, the peer 102a communicates the handle to the ISP DNS 306. The ISP DNS 306, thereafter, directs the request to the central DNS 308 at step 808. At step 810, the central DNS then communicates a name server to the ISP DNS 306 based on the location string. Subsequently, at step 812, based on the name server received from the central DNS 308, the ISP DNS 306 redirects the request for download to the cache DNS 310. The cache DNS 310 includes one or more caches 312. Thus, at step 814, the cache DNS 310 allocates one of the caches 312, such as, for example cache 312a. In an embodiment of the present invention, the allocation of one of the caches 312 for downloading is based on the loads of the caches 312. The cache DNS 310 allocates one of the caches 312 with the minimum load. In an embodiment of the present invention, the load of the caches 312 is based on the number of requests being served for download or the bandwidth availability for downloading digital objects.

Thereafter, at step 816, the ISP DNS 306 communicates the cache 312a information to the peer 102a. The peer 102a then establishes a communication with the cache 31.2a, providing details of the digital object to be downloaded, at step 818. Subsequently, at step 820, the peer 102a downloads the pieces of the digital object from the cache 312a.

The foregoing description is that of the preferred embodiments of the invention and that various changes and modifications may be made thereto without departing from the spirit and scope of the invention.

The invention claimed is:

1. A method comprising the steps of:
sending, from a client to a server, a request for an address of a preferred cache among a plurality of caches in a peer-to-peer network, the request requesting a download of digital data;
receiving a handle, wherein a proxy intercepts the handle and the proxy modifies the handle to insert the address of the preferred cache; and
selecting the preferred cache from the plurality of caches, the selection being derived from a network address of the client.

2. The method of claim 1, wherein the network address of the client is the IP address of the client.

3. The method of claim 2, wherein selecting the preferred cache is further based upon availability of the plurality of caches, network costs, location of data and/or network tasks.

4. The method of claim 1, wherein the server is a location server.

5. The method of claim 1, wherein the server is a tracker.

6. The method of claim 1, further comprising transferring the address of the preferred cache to the client.

7. The method of claim 6, wherein the address of the preferred cache is transferred by a name server.

8. The method of claim 7, wherein the name server is a DNS server.

9. The method of claim 1, further comprising passing the handle to a name server.

10. The method of claim 1, wherein the handle comprises a location string.

11. The method of claim 1, wherein the handle comprises a publisher string.

12. The method of claim 1, wherein the handle comprises a protocol string.

13. The method of claim 1, wherein selecting the preferred cache is based on at least part of the handle.

14. The method of claim 1, wherein selecting the preferred cache from the plurality of caches comprises using the network address of the client to identify a location of the client relative to one or more of the plurality of caches.

15. A server with a processor operably coupled to a memory, wherein:
   the processor is operative for selecting a preferred cache for the download of digital data from a plurality of caches in a peer-to-peer network;
   the selection being derived from a network address of a client requesting the address of the preferred cache for a download of the digital data wherein the server returns a handle to the client, the handle being intercepted by a proxy and the proxy modifying the handle to insert an address of the preferred cache.

16. The server of claim 15, wherein the network address of the client is the IP address of the client.

17. The server of claim 15, wherein the server is connected to a database.

18. The server of claim 15, wherein the server further comprises a name server for transferring an address of the preferred cache to the client.

19. The server of claim 18, wherein the name server is a DNS server.

20. The server of claim 18, wherein the name server is connected to the database.

21. The server of claim 15, wherein the server is integrated in a tracker for tracking peer-to peer information.

22. The server of claim 15, wherein the server is integrated in a proxy for tracker communications.

* * * * *